(12) United States Patent
Levisse et al.

(10) Patent No.: US 12,196,139 B2
(45) Date of Patent: Jan. 14, 2025

(54) SPEED REDUCER EQUIPPED WITH AN ELECTRIC MACHINE

(71) Applicant: SAFRAN AIRCRAFT ENGINES, Paris (FR)

(72) Inventors: Paul Ghislain Albert Levisse, Moissy-Cramayel (FR); Emmanuel Fabrice Marie Baret, Moissy-Cramayel (FR); Franck Emmanuel Bosco, Moissy-Cramayel (FR); Julien Fabien Patrick Becoulet, Moissy-Cramayel (FR); Michel Gilbert Roland Brault, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 21 days.

(21) Appl. No.: 17/905,313

(22) PCT Filed: Mar. 3, 2021

(86) PCT No.: PCT/FR2021/050361
§ 371 (c)(1),
(2) Date: Aug. 30, 2022

(87) PCT Pub. No.: WO2021/181028
PCT Pub. Date: Sep. 16, 2021

(65) Prior Publication Data
US 2023/0126327 A1    Apr. 27, 2023

(30) Foreign Application Priority Data

Mar. 9, 2020    (FR) ........................................ 2002328

(51) Int. Cl.
*F02C 7/36*    (2006.01)
*F16H 1/28*    (2006.01)
(Continued)

(52) U.S. Cl.
CPC .................. *F02C 7/36* (2013.01); *F16H 1/28* (2013.01); *F16H 57/0476* (2013.01);
(Continued)

(58) Field of Classification Search
CPC .......... F02C 7/36; F16H 1/28; F16H 57/0476; F16H 57/0482; F16H 2057/02034;
(Continued)

(56) References Cited

U.S. PATENT DOCUMENTS

| 4,291,233 A | * | 9/1981 | Kirschbaum | ........ H02K 16/005 |
| | | | | 416/DIG. 4 |
| 2010/0154384 A1 | * | 6/2010 | Schilling | .................... F01D 5/03 |
| | | | | 60/268 |

(Continued)

FOREIGN PATENT DOCUMENTS

WO    2019/243558 A1    12/2019

OTHER PUBLICATIONS

International Search Report received for PCT Patent Application No. PCT/FR2021/050361, mailed on May 3, 2021, 5 pages (2 pages of English Translation and 3 pages of Original Document).

*Primary Examiner* — Phutthiwat Wongwian
*Assistant Examiner* — Susan E Scharpf
(74) *Attorney, Agent, or Firm* — Womble Bond Dickinson (US) LLP

(57) ABSTRACT

The invention relates to a planetary gear reducer (21) for an aircraft turbine engine (1), the reducer (21) comprising a sun gear (30) and a ring gear (33) which are centred on a longitudinal axis X and a planet carrier (32) which carries at least one planet gear (31) rotatably mounted about a planet axis A parallel to the longitudinal axis X, the sun gear (30) being rotatable about the longitudinal axis, the planet gear (31) meshing both with the sun gear (30) and the ring gear (33), the planet carrier (32) being movable about the longi- (Continued)

tudinal axis and the ring gear (33) being rotationally fixed. According to the invention, the reducer (21) comprises an electric machine (50) integrated therewith and which comprises a rotor (51) mounted on the planet carrier (32) in such a way as to be rotated about the longitudinal axis X and a stator (52) mounted on the ring gear (33).

22 Claims, 2 Drawing Sheets

(51) Int. Cl.
  *F16H 57/02* (2012.01)
  *F16H 57/04* (2010.01)
  *F16H 57/08* (2006.01)
  *H02K 7/116* (2006.01)

(52) U.S. Cl.
  CPC ....... *F16H 57/0482* (2013.01); *F16H 57/082* (2013.01); *H02K 7/116* (2013.01); *F05D 2230/51* (2013.01); *F05D 2260/40311* (2013.01); *F16H 2057/02034* (2013.01); *F16H 2057/02043* (2013.01); *F16H 2057/085* (2013.01)

(58) Field of Classification Search
  CPC ..... F16H 2057/02043; F16H 2057/085; F16H 27/082; H02K 7/116; H02K 7/1823; F02D 2230/51; F02D 2260/40311; F02D 2220/76; B60K 17/04; B60K 17/08; F01D 15/10; F02K 5/00
  See application file for complete search history.

(56) References Cited

U.S. PATENT DOCUMENTS

| | | | |
|---|---|---|---|
| 2013/0000323 A1* | 1/2013 | Kupratis | F02C 3/113 60/801 |
| 2018/0087396 A1* | 3/2018 | van der Merwe | F01D 5/06 |
| 2018/0209350 A1* | 7/2018 | Kupratis | F02C 7/36 |
| 2019/0085714 A1* | 3/2019 | Zatorski | H02K 7/116 |
| 2019/0301593 A1* | 10/2019 | Lemoine | F16H 57/082 |
| 2020/0340406 A1* | 10/2020 | Maljean | H02K 7/1823 |

\* cited by examiner

SPEED REDUCER EQUIPPED WITH AN ELECTRIC MACHINE

FIELD OF THE INVENTION

The present invention relates to the field of speed reducers, in particular for aircraft turbomachine. It is aimed in particular at a speed reducer equipped with an electric machine and a turbomachine comprising such a speed reducer.

TECHNICAL BACKGROUND

The prior art comprises the documents US-A1-2019/085714, WO-A1-2019/243558 and U.S. Pat. No. 4,291,233.

An aircraft turbomachine, such as a double-flow turbomachine, typically comprises a shrouded fan arranged at the inlet of the turbomachine and rotated by a low-pressure shaft. A reducer can be interposed between the fan and the low-pressure shaft so that the fan rotates at a lower speed than that of the low-pressure shaft. The reduction in speed also allows the size of the fan to be increased allowing very high bypass ratios to be achieved. In addition to the propulsion of the aircraft, the turbomachine ensures the production of electric current using a permanent magnet alternator (PMA) and an accessory gear box (AGB) to feed various items of equipment allowing for example the lighting of the cabin of the aircraft or the air conditioning and pressurisation system of the cabin of the aircraft.

It is known to equip the turbomachine and in particular the accessory gear box of an electric machine. An electric machine is an electromechanical device based on electromagnetism that allows the conversion of electrical energy into mechanical energy (generator mode) or reversibly, allowing the production of electricity from mechanical energy (motor mode). The electric machine can behave equally well in generator mode as in motor mode.

Faced with the environmental challenge in the aeronautical field and the need for electrical power, which is growing in tandem with the number of items of equipment and new functions of the aircraft, the question of hybridisation of the turbomachine arises. The electric machine as described above does not allow to provide a significant gain in electrical power for all the functions of the aircraft and the efficiency of the conversion of mechanical power into electrical power is not at its optimum. In addition, the integration of the electric machine in various areas of the turbomachine is complex and is constrained by overall dimensions requirements, the temperature resistance of certain components of the electric machine, the accessibility, the performance of the turbomachine itself, etc.

SUMMARY OF THE INVENTION

The object of the present invention is to provide ease of integration of an electric machine for providing an additional electrical power in a turbomachine without substantially modifying the members of the turbomachine.

This is achieved in accordance with the invention by means of a reducer with epicyclic gear train for an aircraft turbomachine, the reducer comprising a sun gear and a ring gear which are centred on a longitudinal axis and a planet carrier which carries at least one planet gear mounted so as to be able to rotate about a planet gear axis parallel to the longitudinal axis X, the sun gear being able to rotate about the longitudinal axis, the planet gear meshing with both the sun gear and the ring gear, the planet carrier being movable about the longitudinal axis and the ring gear being stationary in rotation, the reducer comprising an electric machine integrated therein and comprising a rotor mounted on the planet carrier so as to be driven in rotation about the longitudinal axis X and a stator mounted on the ring gear.

Thus, this solution allows to achieve the above-mentioned objective. In particular, this configuration allows, on the one hand, to avoid cluttering up the turbomachine since the electric machine is integrated into the reducer and, on the other hand, to take advantage of the reducer arrangement (stationary ring gear and movable planet carrier) to control the position of the rotor and the stator so as to have an acceptable air-gap. Furthermore, the integration of the electric machine into the reducer allows to provide a modular approach as the members of the reducer and of the electric machine can be assembled independently of each other and also independently of other members of the turbomachine. The mounting and dismounting are also simplified by the fact that the electric machine and the reducer are located in the same place.

The reducer also comprises one or more of the following characteristics, taken alone or in combination:
- the stator of the electric machine extends around the rotor of the electric machine.
- the stator comprises a first annular part centred on the longitudinal axis and extending the ring gear downstream along the longitudinal axis.
- In particular, the rotor and stator downstream of the speed reducer are more accessible, unlike those of the prior art, which are located at the heart of the speed reducer, implying that the electric machine must be mounted at the same time as each member of the speed reducer.
- the first annular part is fitted on the ring gear or formed as an integral part of the ring gear.
- the rotor comprises a second annular part mounted on a cage of the planet carrier.
- an electric harness extends outside the ring gear and at least one electric cable connected to the stator of the electric machine circulates inside the electric harness.
- the planet carrier comprises an annular cage carrying a plain bearing on which the planet gear is mounted.

The invention also relates to an aircraft turbomachine comprising a drive shaft of longitudinal axis X and a fan having a fan shaft driven in rotation by the drive shaft via a reducer having any of the above characteristics, the ring gear being attached to a stator casing of the turbomachine and the planet carrier being coupled to the fan shaft to drive it in rotation about the longitudinal axis.

The turbomachine also comprises one or more of the following characteristics, alone or in combination:
- the sun gear is coupled to the drive shaft to drive it in rotation around the longitudinal axis.
- the lubrication enclosure is delimited at least partly by a shroud forming at least partly a radially internal wall of the primary duct and the fan shaft.
- the reducer and the electric machine are arranged in a lubrication enclosure arranged upstream of an internal casing.

The invention also relates to a method of modular assembly for a turbomachine as above-mentioned, the method comprising the following steps:
- assembling the speed reducer as described above,
- integrating the electric machine with the speed reducer by mounting the rotor on the planet carrier and the stator on the ring gear, and mounting the assembly comprising the speed reducer and the integrated electric machine in the lubrication enclosure of the turbomachine.

BRIEF DESCRIPTION OF THE FIGURES

The invention will be better understood, and other purposes, details, characteristics and advantages thereof will become clearer on reading the following detailed explanatory description of embodiments of the invention given by way of purely illustrative and non-limiting examples, with reference to the attached schematic drawings in which.

DETAILED DESCRIPTION OF THE INVENTION

Figure 1:
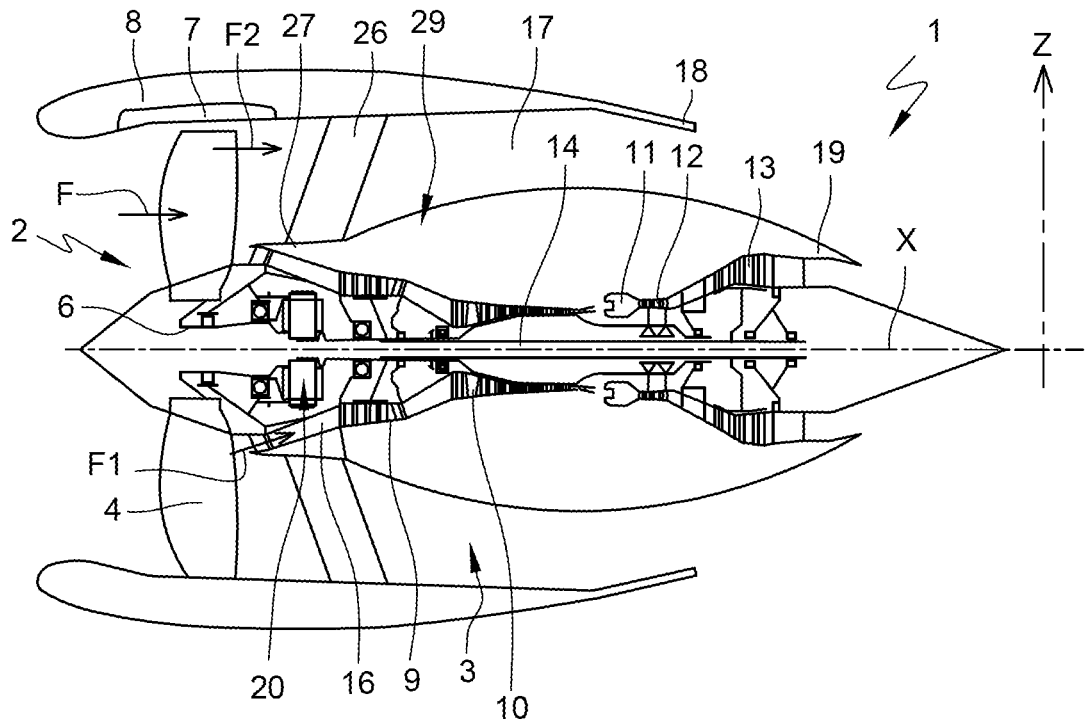
FIG. 1 is a schematic axial cross-sectional view of a double-flow turbomachine with a reducer according to the invention.

FIG. 1 shows an axial cross-sectional view of a turbomachine 1 of longitudinal axis X to which the invention applies. The turbomachine shown is a double-flow and double-body turbomachine for mounting on an aircraft according to the invention. Of course, the invention is not limited to this type of turbomachine.

In the present application, the terms "upstream", "downstream", "axial" and "axially" are defined with respect to the direction of gas flow in the turbomachine and also along the longitudinal axis (and even from left to right in FIG. 1). The terms "radial", "radially", "internal" and "external" are also defined with respect to a radial axis Z that is perpendicular to the axis X of the turbomachine.

This turbomachine 1 with double-flow and double-body comprises a fan 2 which is mounted upstream of a gas generator 3. The fan 2 comprises a plurality of fan vanes 4 which extend radially from the periphery of a disc 5 (see FIG. 2) through which a fan shaft 6 extends. The fan 2 is surrounded by a fan casing 7 which at least partly carries a nacelle 8. The latter extends around the gas generator 3 and along the longitudinal axis X.

The gas generator 3 comprises from upstream to downstream a low-pressure compressor 9, a high-pressure compressor 10, a combustion chamber 11, a high-pressure turbine 12 and a low-pressure turbine 13. The high-pressure (HP) compressor 10 is connected to the HP turbine via an HP shaft to form a first body referred to as high-pressure. The low-pressure (LP) compressor 9 is connected to the LP turbine via a LP shaft 14 to form a second body referred to as low-pressure. The HP shaft extends inside the LP shaft 14.

An air flow F entering the turbomachine via the fan 2 is divided by a splitter nose 15 of the turbomachine into a primary air flow F1 which flows through the gas generator 3 and in particular in a primary duct 16, and a secondary air flow F2 which flows around the gas generator 3 in a secondary duct. The primary duct 16 and the secondary duct 17 are coaxial. The secondary air flow F2 is ejected through a secondary nozzle 18 terminating the nacelle 8 while the primary air flow F1 is ejected outside the turbomachine via an ejection nozzle 19 located downstream of the gas generator. The primary and secondary air flows meet at the outlet of their respective nozzles.

Figure 2:
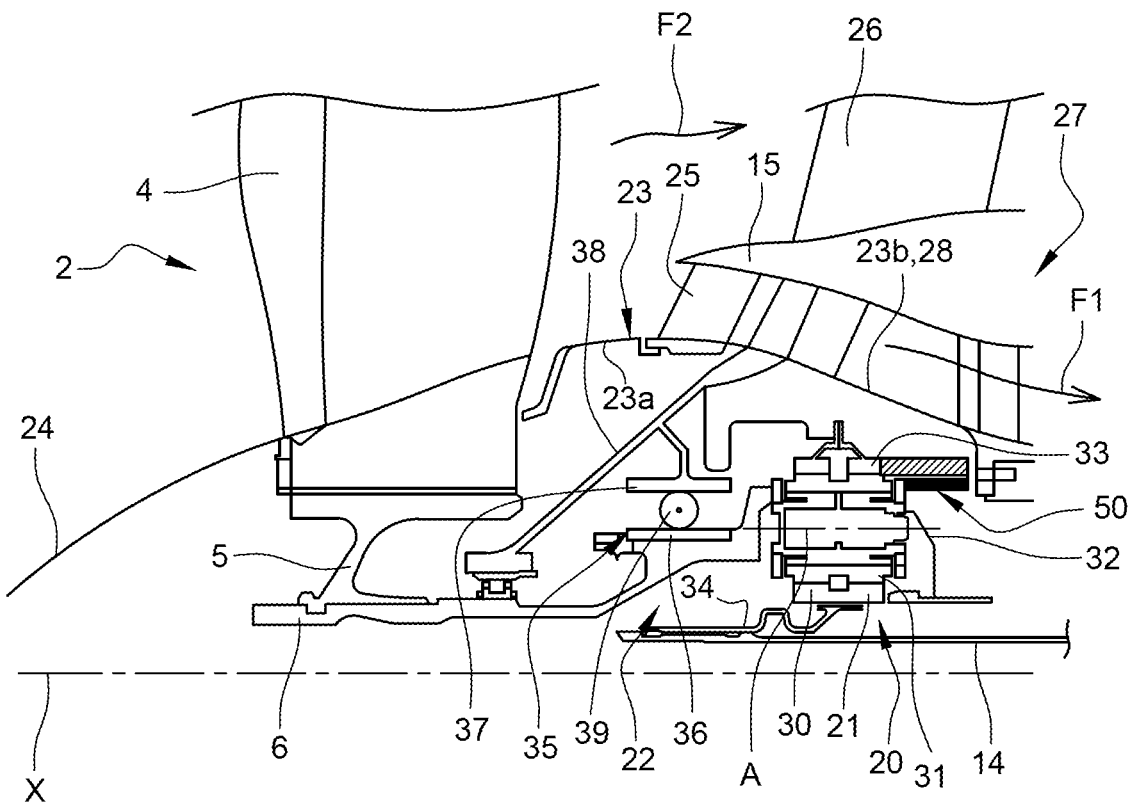
FIG. 2 is a schematic, axial cross-sectional and detail view of a fan module of the double-flow turbomachine with a reducer interposed between a fan shaft and a drive shaft of the turbomachine according to the invention.

With reference to FIG. 2, the fan shaft 6 is connected to a drive shaft which drives it in rotation about the longitudinal axis via a power transmission mechanism 20. In this example, the drive shaft is the low-pressure shaft 14. The power transmission mechanism 20 allows the speed of the fan 2 to be reduced to a lower speed than that of the low-pressure shaft 14. On the other hand, the power transmission mechanism 20 allows the arrangement of a fan with a large diameter in order to increase the bypass ratio. The bypass ratio of the fan is advantageously higher than 10. Preferably, the bypass ratio is between 12 and 18.

The power transmission mechanism comprises a reducer 21, which in this case is a speed reducer with epicyclic gear train. The latter is housed in a lubrication enclosure 22 arranged upstream of the gas generator. The lubrication enclosure allows to lubricate the speed reducer 21 as well as the rotational guide bearings. In particular, the lubrication enclosure 22 is arranged in an annular internal casing 23 which is extended upstream by an aerodynamically shaped inlet cone 24.

The internal casing 23 comprises an annular rotor shroud 23a which rotates about the longitudinal axis X relative to an annular stator shroud 23b of the internal casing 23. The disc 5 of the fan 2 is mounted in the shroud 23a. The stator shroud 23b is structurally connected to an inlet casing 27 by first stator vanes 25 (known by the acronym "IGV") which extend radially into the primary air flow F1 and around the longitudinal axis X. The inlet casing 27 carries the splitter nose 15 upstream and the inlet casing 27 is extended downstream by an inter-duct casing 29. Of course, the rotor shroud 23a, the disc 5 form a rotor assembly, while the inlet casing 27, the stator vane 25 and the stator shroud 23b form a stator assembly. Second stator vanes 26 (known as "OGV") structurally connect the inlet casing 27 to the fan casing 7 which extend radially into the secondary air flow and around the longitudinal axis X. Advantageously, the lubricant occupying the lubrication enclosure 22 is oil in mist form.

The speed reducer 21 with epicyclic gear train typically comprises a sun gear 30 (or internal planetary), at least one planet gear 31, a planet carrier 32, and a ring gear (external planetary) 33. In this example, the reducer comprises several planet gears, for example three. The sun gear 30 is centred on the longitudinal axis X and is rotatably coupled to the drive shaft (here the LP shaft) along the longitudinal axis X via a sun gear shaft 34. The latter comprises first elements for cooperation with complementary second coupling elements carried by the sun gear. The planet gears 31 are carried by the planet carrier 32. Each planet gear 31 meshes with external toothing of the sun gear 30 and internal toothing of the ring gear 33. The planet gears 31 are each guided in rotation about a planet gear axis A which is parallel to the longitudinal axis X. The planet gear axes A are secured to the planet carrier 32. The ring gear 33 surrounds the sun gear 30 and is centred on the longitudinal axis X.

The planet carrier 32 is rotatably coupled to the fan shaft 6 and the ring gear 33 is secured to a stator casing of the turbomachine. In other words, the ring gear 33 is stationary in rotation. In this way, the sun gear 30 forms the inlet to the speed reducer while the planet carrier 32 forms the outlet of the speed reducer. The fan shaft 6, the sun gear shaft 34 and the drive shaft (LP shaft 14) rotate around the longitudinal axis and are coaxial. In this example of embodiment, the planet carrier 32 and the fan shaft 6 are monoblock. In other words, they are formed in one part. The fan shaft 6 is guided in rotation relative to a stationary structure of the turbomachine by means of at least one bearing 35. The latter is advantageously a ball bearing. In particular, the bearing comprises an internal ring 36 mounted on the fan shaft 6, an external ring 37 carried by an annular support 38 and a rolling 39 (balls) between the internal and external rings. The annular support 38 is secured to the stationary structure of the turbomachine.

Figure 3:
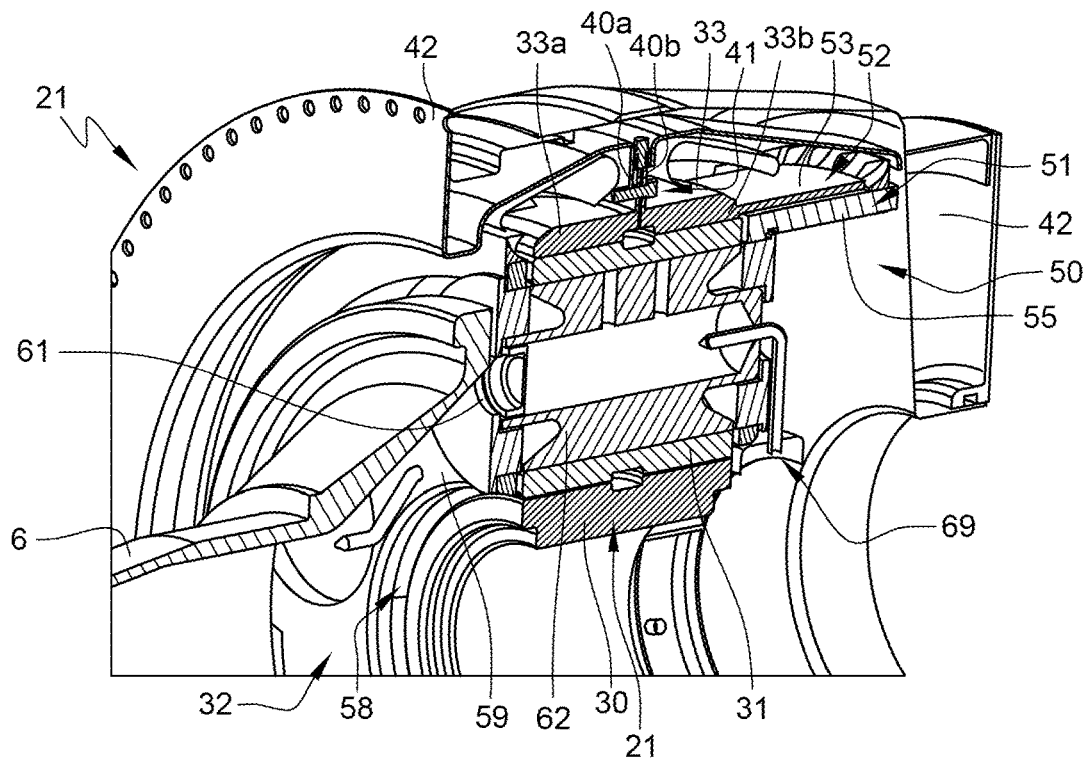
FIG. 3 is an upstream, axial, half-section perspective view of a reducer according to the invention.
Figure 4:
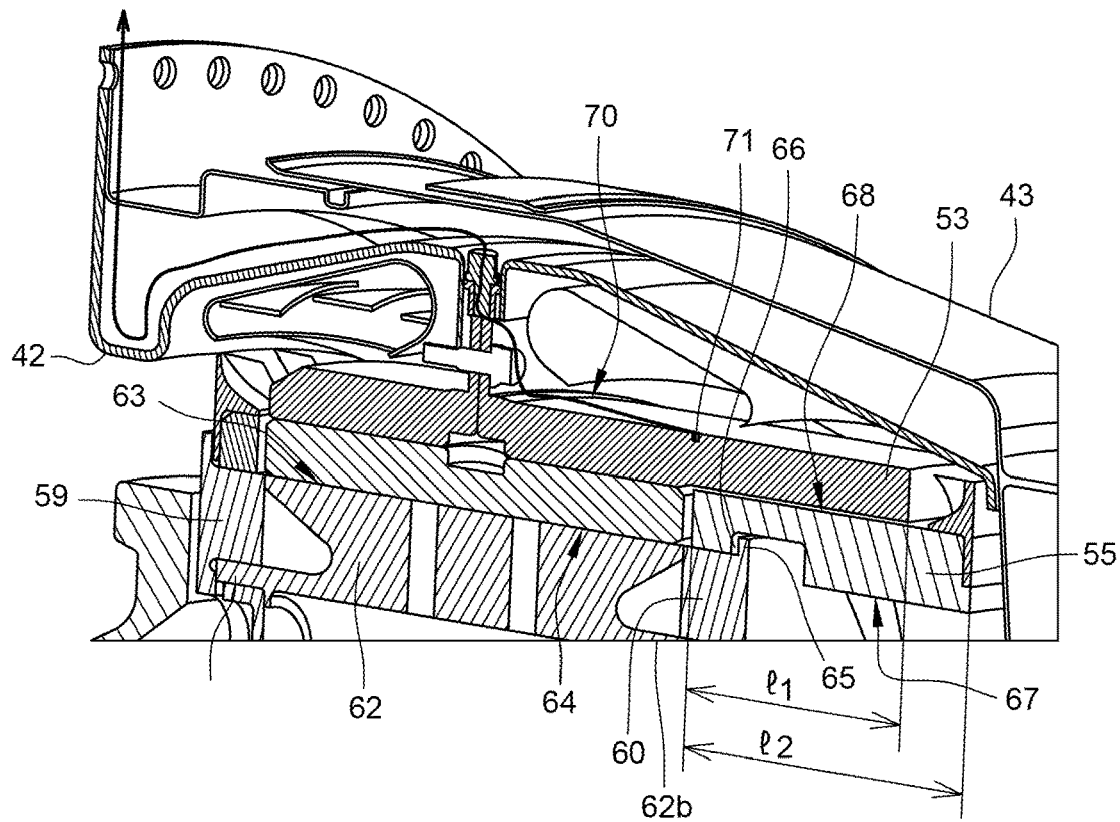
FIG. 4 is a perspective view in axial half-section and downstream of a reducer according to the invention.

In FIGS. 3 and 4, the ring gear 33 is formed by a first portion 33a and a second portion 33b which are coaxial. Each first and second portions 33a, 33b comprises segments of the toothings of the ring gear. Each first and second ring gear portions comprises an annular flange 40a, 40b at one end extending outwardly along the radial axis. The annular flanges are attached to each other by attachment members 41 such as screws, bolts, nuts or the analogous elements. The flanges 40a, 40b are located at the level of a median plane perpendicular to the longitudinal axis. The ring gear 33 is also attached to a ring gear carrier 42 which is attached to the annular support 38 of the bearing 35 with attachment members as described above. A closure cover 43 of the enclosure 22 covers the ring gear 33 radially and a segment of the ring gear carrier 42.

In the present example of embodiment, the turbomachine further comprises an electric machine 50 so as to benefit from additional electrical power. The electric machine 50 operates as a generator and as a motor. In the latter case, the electric machine allows to provide a propulsive function in addition to the fan and fossil fuel. In generator mode, the electric machine provides an additional electrical power of, for example, at least hundred kilowatts.

The electric machine comprises a rotor 51 and a stator 52. As can be seen in FIGS. 3 and 4, the electric machine is arranged in the lubrication enclosure 22 (in the gas generator) in such a way that it can also be cooled by the lubricant. The temperature in the lubrication enclosure is at most around 150° C., which is quite acceptable for the electric machine. This is because the temperature of the components of the electric machine (electrical conductors, electrical insulators, magnetic circuits, temperature sensors, exciters) should not generally exceed this value. In addition, it generates high power which is directly evacuated into the lubricating oil.

The enclosure 22 is delimited at least partly by the shroud 23b, 28 forming at least partly a radially internal wall of the primary duct, the fan shaft 6 and the support 38 of the bearing 35. Air is circulated outside the enclosure 22, for example, between the support 38 and the internal casing 23 and inter-duct casing 27 assembly.

The electric machine is integrated into the speed reducer 21, which allows to facilitate the integration into the gas generator and in particular into the lubrication enclosure 22. For this purpose, the rotor 51 is mounted on the planet carrier 32 so as to drive in rotation about the longitudinal axis and the stator 52 is mounted on the ring gear 33.

The stator 52 comprises a first part 53 which is annular around the longitudinal axis and is secured to the ring gear 33. The first annular part 53 here extends the annular ring gear 33 downstream along the longitudinal axis X. The first annular part 53 is a fitted part (i.e. it is separate and/or made using a different manufacturing method) on the ring gear. The stator 52 (first annular part) can be attached by gluing, screwing (screws/bolts/nuts), etc. to the ring gear 33. Alternatively, the annular part 53 formed as an integral part of (i.e. in one part) of the ring gear. The stator 52 extends around the rotor 51. The first annular part 53 is advantageously carried by the second portion 33b of the ring gear (that arranged downstream of the speed reducer) as can be seen in FIGS. 3 and 4.

As for the rotor 51, it also comprises a second part 55 annular around the longitudinal axis X. The rotor 51 can be attached by gluing, screwing (screws/bolts/nuts), etc. to the planet carrier. The first part 53 and the second part 55 are concentric. We understand that the second part 55 extends downstream of the speed reducer as well. The first annular part 53 has a length l1 that is substantially less than that l2 of the second part 55. To realize the mounting of the rotor 51 on the planet carrier, the latter comprises an annular cage 58 centred on the longitudinal axis. The first flank 59 is mounted upstream of the speed reducer while the second flank 60 is mounted downstream of the speed reducer. Each of the first and second flanks comprises axial orifices 61 (see FIG. 3) passing through their walls on either side along an axis parallel to the longitudinal axis X. Each planet gear is rotatably mounted about a planet gear axis on a bearing 62. Each bearing is preferably, but not exclusively, a plain bearing. Each bearing is coaxial with the planet gear axis and its free ends 62a, 62b are mounted respectively at the level of a corresponding orifice in the first and second flanks 59, 60. A film of oil circulates between the external surface 63 of each bearing and the internal surface 64 of each planet gear. This oil film is continuously fed through a lubrication circuit 69 so as to improve the performance of the speed reducer and extend the service life of the plain bearings.

As can also be seen in FIGS. 3 and 4, the second annular part 55 is mounted on the periphery of the second flank 60. For this purpose, the second flank 60 has an annular collar 65 extending outwards along the radial axis. The collar 65 is housed in a notch 66 in the second annular part 55. The notch 66 is arranged in a radially internal surface 67 of the first annular part 53 and faces the longitudinal axis. The second annular part 55 also has a radially external surface 68 (opposite the radially internal surface along the radial axis) and carries permanent magnets. The permanent magnets are arranged facing a coiling carried by the first annular part 53. Of course, the second annular part can conversely comprise the coiling and the first annular part can comprise the permanent magnets.

With reference to FIG. 4, an electric harness 70 extends radially outwards from the ring gear 33 and runs outwards from the speed reducer. In particular, the electric machine 50 comprises at least one electric cable 71 which connects the electric stator to an electronic control system (such as FADEC or a full authority control system) so as to allow the electrical power to be fed to the electric machine. Advantageously, other electric cables of the electric machine 50 are gathered in this single harness 70. The electric harness 70 runs outside the enclosure via a casing arm or stator vane. The fact that the ring gear 33 of the planetary gear speed reducer is stationary facilitates, in particular, the exit of this electric harness outside the enclosure towards external members of the turbomachine.

When the electric machine 50 is operating in motor mode, it adds torque to the outlet of the reducer 21 so as to provide more power to the fan, for example. One or more batteries may be installed in the aircraft and the electrical energy is brought to the electric machine 50 via the electric cable 71. This energy allows to rotate the rotor 51 of the electric machine 50. The electrical energy is thus converted into mechanical energy. An input of energy is supplied to assist in the rotation of the fan 2 via the fan shaft 6.

When the electric machine is in generator mode, the electric machine 50 draws torque from the reducer 21 to provide an additional electrical power. The torque is transmitted through the shaft 14 to the reducer 21 and is transmitted to the fan shaft 6 and to the electric machine 50. The latter converts mechanical energy into electrical energy to feed the electrical equipments such as batteries attached to the aircraft, aircraft equipment, or electrical motors attached to the aircraft (non-exhaustive list).

As we have seen, the integration of the electric machine 50 on the speed reducer 21 allows the modularisation of the reducer +electric machine assembly. For this purpose, during the mounting, the speed reducer 21 is first assembled with its individual components. Then the electric machine 50, with its rotor and its stator, is mounted on the speed reducer with the stator on the ring gear 33 and the rotor on the planet carrier 32. The stator and the rotor extend downstream of the speed reducer, and in particular downstream of the ring gear and the planet carrier. This location facilitates the mounting and dismounting of the electric machine on the speed reducer. If the stator is monoblock with the ring gear, the stator is assembled on the reducer at the same time as the ring gear. The electric cable 71 is connected to the electric machine 50. Finally, the reducer and the electric machine are installed in the lubrication enclosure 22 as a single unit, and the assembly is therefore easily modular. This assembly is slid from upstream to downstream so that the sun gear shaft 34 is coupled with the drive shaft (LP shaft). The disc 5 and the fan shaft 6 are then inserted from upstream of the internal casing to couple the fan shaft 6 to the planet carrier 32. The inlet cone 24 is then mounted on the internal casing to close the fan module.

The invention claimed is:

1. A reducer with epicyclic gear train for an aircraft turbomachine, the reducer comprising a sun gear and a ring gear which are centred on a longitudinal axis X and a planet carrier which carries at least one planet gear mounted so as to be able to rotate about a planet gear axis A parallel to the longitudinal axis X, the sun gear being able to rotate about the longitudinal axis, the planet gear meshing with both the sun gear and the ring gear, the planet carrier being movable about the longitudinal axis and the ring gear being stationary in rotation, wherein the reducer comprises an electric machine integrated therewith and which comprises a rotor mounted on the planet carrier so as to be driven in rotation about the longitudinal axis X and a stator mounted on the ring gear,
wherein an electric harness extends outside the ring gear and at least one electric cable connected to the stator of the electric machine circulates inside the electric harness.

2. The reducer according to claim 1, wherein the stator of the electric machine extends around the rotor of the electric machine.

3. The reducer according to claim 1, wherein the stator comprises a first annular part centred on the longitudinal axis and extending the ring gear downstream along the longitudinal axis.

4. The reducer according to claim 3, wherein the first annular part is fitted on the ring gear or formed as an integral part of the ring gear.

5. The reducer according to claim 4, wherein the rotor comprises a second annular part mounted on a cage of the planet carrier.

6. The reducer according to claim 1, wherein an electric harness extends outside the ring gear and at least one electric cable connected to the stator of the electric machine circulates inside the electric harness.

7. The reducer according to claim, 1, wherein the planet carrier comprises an annular cage carrying a plain bearing on which the planet gear is mounted.

8. An aircraft turbomachine comprising a drive shaft of longitudinal axis X and a fan having a fan shaft driven in rotation by the drive shaft via a reducer according to claim 1, the ring gear being attached to a stator casing of the turbomachine and the planet carrier being coupled to the fan shaft in order to drive it in rotation about the longitudinal axis.

9. The turbomachine according to claim 8, wherein the reducer and the electric machine are arranged in a lubrication enclosure arranged upstream of an internal casing.

10. The turbomachine according to claim 8, wherein the sun gear is coupled to the drive shaft for driving it in rotation about the longitudinal axis.

11. A method of modular assembly for a turbomachine according to claim 9, wherein the method comprises the following steps:
assembling a speed reducer with epicyclic gear train for an aircraft turbomachine, the reducer comprising a sun gear and a ring gear which are centred on a longitudinal axis X and a planet carrier which carries at least one planet gear mounted so as to be able to rotate about a planet gear axis A parallel to the longitudinal axis X, the sun gear being able to rotate about the longitudinal axis, the planet gear meshing with both the sun gear and the ring gear the planet carrier being movable about the longitudinal axis and the ring gear being stationary in rotation, wherein the reducer comprises an electric machine integrated therewith and which comprises a rotor mounted on the planet carrier so as to be driven in rotation about the longitudinal axis X and a stator mounted on the ring gear,
integrating the electric machine with the speed reducer by mounting the rotor on the planet carrier and the stator on the ring gear, and
mounting the speed reducer and integrated electric machine assembly in the lubrication enclosure of the turbomachine.

12. A method of modular assembly for a turbomachine according to claim 9, wherein the method comprises the following steps:
assembling a speed reducer, with epicyclic gear train for an aircraft turbomachine, the reducer comprising a sun gear and a ring gear which are centred on a longitudinal axis X and a planet carrier which carries at least one planet gear mounted so as to be able to rotate about a planet gear axis A parallel to the longitudinal axis X, the sun gear being able to rotate about the longitudinal axis, the planet gear meshing with both the sun gear and the ring gear the planet carrier being movable about the longitudinal axis and the ring gear being stationary in rotation, wherein the reducer comprises an electric machine integrated therewith and which comprises a rotor mounted on the planet carrier so as to be driven in rotation about the longitudinal axis X and a stator mounted on the ring gear, wherein the stator of the electric machine extends around the rotor of the electric machine,
integrating the electric machine with the speed reducer by mounting the rotor on the planet carrier and the stator on the ring gear, and
mounting the speed reducer and integrated electric machine assembly in the lubrication enclosure of the turbomachine.

13. A method of modular assembly for a turbomachine according to claim 9, wherein the method comprises the following steps:
assembling a speed reducer, with epicyclic gear train for an aircraft turbomachine, the reducer comprising a sun gear and a ring gear which are centred on a longitudinal axis X and a planet carrier which carries at least one planet gear mounted so as to be able to rotate about a planet gear axis A parallel to the longitudinal axis X, the sun gear being able to rotate about the longitudinal axis, the planet gear meshing with both the sun gear and the ring gear the planet carrier being movable about the longitudinal axis and the ring gear being stationary in rotation, wherein the reducer comprises an electric machine integrated therewith and which comprises a rotor mounted on the planet carrier so as to be driven in rotation about the longitudinal axis X and a stator mounted on the ring gear, wherein the stator comprises a first annular part centred on the longitudinal axis and extending the ring gear downstream along the longitudinal axis,
integrating the electric machine with the speed reducer by mounting the rotor on the planet carrier and the stator on the ring gear, and
mounting the speed reducer and integrated electric machine assembly in the lubrication enclosure of the turbomachine.

14. A method of modular assembly for a turbomachine according to claim 9, wherein the method comprises the following steps:
assembling a speed reducer, with epicyclic gear train for an aircraft turbomachine, the reducer comprising a sun gear and a ring gear which are centred on a longitudinal axis X and a planet carrier which carries at least one planet gear mounted so as to be able to rotate about a planet gear axis A parallel to the longitudinal axis X, the sun gear being able to rotate about the longitudinal axis, the planet gear meshing with both the sun gear and the ring gear the planet carrier being movable about the longitudinal axis and the ring gear being stationary in rotation, wherein the reducer comprises an electric machine integrated therewith and which comprises a rotor mounted on the planet carrier so as to be driven in rotation about the longitudinal axis X and a stator mounted on the ring gear, wherein the stator comprises a first annular part centred on the longitudinal axis and extending the ring gear downstream along the longitudinal axis, and the first annular part is fitted on the ring gear or formed as an integral part of the ring gear,
integrating the electric machine with the speed reducer by mounting the rotor on the planet carrier and the stator on the ring gear, and
mounting the speed reducer and integrated electric machine assembly in the lubrication enclosure of the turbomachine.

15. A method of modular assembly for a turbomachine according to claim 9, wherein the method comprises the following steps:
assembling a speed reducer, with epicyclic gear train for an aircraft turbomachine, the reducer comprising a sun gear and a ring gear which are centred on a longitudinal axis X and a planet carrier which carries at least one planet gear mounted so as to be able to rotate about a planet gear axis A parallel to the longitudinal axis X, the sun gear being able to rotate about the longitudinal axis, the planet gear meshing with both the sun gear and the ring gear the planet carrier being movable about the longitudinal axis and the ring gear being stationary in rotation, wherein the reducer comprises an electric machine integrated therewith and which comprises a rotor mounted on the planet carrier so as to be driven in rotation about the longitudinal axis X and a stator mounted on the ring gear, wherein the stator comprises a first annular part centred on the longitudinal axis and extending the ring gear downstream along the longitudinal axis, and the first annular part is fitted on the ring gear or formed as an integral part of the ring gear, and the rotor comprises a second annular part mounted on a cage of the planet carrier,
integrating the electric machine with the speed reducer by mounting the rotor on the planet carrier and the stator on the ring gear, and
mounting the speed reducer and integrated electric machine assembly in the lubrication enclosure of the turbomachine.

16. A method of modular assembly for a turbomachine according to claim 9, wherein the method comprises the following steps:
assembling a speed reducer, with epicyclic gear train for an aircraft turbomachine, the reducer comprising a sun gear and a ring gear which are centred on a longitudinal axis X and a planet carrier which carries at least one planet gear mounted so as to be able to rotate about a planet gear axis A parallel to the longitudinal axis X, the sun gear being able to rotate about the longitudinal axis, the planet gear meshing with both the sun gear and the ring gear the planet carrier being movable about the longitudinal axis and the ring gear being stationary in rotation, wherein the reducer comprises an electric machine integrated therewith and which comprises a rotor mounted on the planet carrier so as to be driven in rotation about the longitudinal axis X and a stator mounted on the ring gear, wherein an electric harness extends outside the ring gear and at least one electric cable connected to the stator of the electric machine circulates inside the electric harness,
integrating the electric machine with the speed reducer by mounting the rotor on the planet carrier and the stator on the ring gear, and
mounting the speed reducer and integrated electric machine assembly in the lubrication enclosure of the turbomachine.

17. A method of modular assembly for a turbomachine according to claim 9, wherein the method comprises the following steps:
assembling a speed reducer, with epicyclic gear train for an aircraft turbomachine, the reducer comprising a sun gear and a ring gear which are centred on a longitudinal axis X and a planet carrier which carries at least one planet gear mounted so as to be able to rotate about a planet gear axis A parallel to the longitudinal axis X, the sun gear being able to rotate about the longitudinal axis, the planet gear meshing with both the sun gear and the ring gear the planet carrier being movable about the longitudinal axis and the ring gear being stationary in rotation, wherein the reducer comprises an electric machine integrated therewith and which comprises a rotor mounted on the planet carrier so as to be driven in rotation about the longitudinal axis X and a stator mounted on the ring gear, wherein the planet carrier comprises an annular cage carrying a plain bearing on which the planet gear is mounted, integrating the electric machine with the speed reducer by mounting the rotor on the planet carrier and the stator on the ring gear, and mounting the speed reducer and integrated electric machine assembly in the lubrication enclosure of the turbomachine.

18. The reducer according to claim 6, wherein the harness is a single harness ant other electric cables of the electric machine are gathered in said single harness, the electric harness running outside the enclosure via a casing arm or stator vane.

19. The reducer according to claim 1, wherein the speed reducer comprises an annular cage centered on the longitudinal axis and equipped with a first flank mounted upstream of the speed reducer and a second flank mounted downstream of the speed reducer, each of the first and second flanks comprises axis of rotation of said planet gear, the rotor being mounted on the second flank and extending downstream along the longitudinal axis.

20. A reducer with epicyclic gear train for an aircraft turbomachine, the reducer comprising a sun gear and a ring gear which are centered on a longitudinal axis X and a planet carrier which carries at least one planet gear mounted so as to be able to rotate about a planet gear axis A parallel to the longitudinal axis X, the sun gear being able to rotate about the longitudinal axis, the planet gear meshing with both the sun gear and the ring gear, the planet carrier being movable about the longitudinal axis and the ring gear being stationary in rotation, wherein the reducer comprises an electric machine integrated therewith and which comprises a rotor mounted on the planet carrier so as to be driven in rotation about the longitudinal axis X and a stator mounted on the ring gear, wherein the planet carrier comprises an annular cage carrying a plain bearing on which the planet gear is mounted.

21. A reducer with epicyclic gear train for an aircraft turbomachine, the reducer comprising a sun gear and a ring gear which are centered on a longitudinal axis X and a planet carrier which carries at least one planet gear mounted so as to be able to rotate about a planet gear axis A parallel to the longitudinal axis X, the sun gear being able to rotate about the longitudinal axis, the planet gear meshing with both the sun gear and the ring gear, the planet carrier being movable about the longitudinal axis and the ring gear being stationary in rotation, wherein the reducer comprises an electric machine integrated therewith and which comprises a rotor mounted on the planet carrier so as to be driven in rotation about the longitudinal axis X and a stator mounted on the ring gear, wherein the speed reducer comprises an annular cage centered on the longitudinal axis and equipped with a first flank mounted upstream of the speed reducer and a second flank mounted downstream of the speed reducer, each of the first and second flanks comprises axis of rotation of said planet gear, the rotor being mounted on the second flank and extending downstream along the longitudinal axis.

22. The reducer according to claim 1, wherein the electric machine is a single electric machine.

\* \* \* \* \*